United States Patent [19]

Mueller et al.

[11] Patent Number: 5,614,410
[45] Date of Patent: Mar. 25, 1997

[54] BIOREMEDIATION OF SOIL OR GROUNDWATER CONTAMINATED WITH COMPOUNDS IN CREOSOTE BY TWO-STAGE BIODEGRADATION

[75] Inventors: James G. Mueller; Parmely H. Pritchard; Suzanne Lantz, all of Gulf Breeze, Fla.

[73] Assignees: SBP Technologies, Inc., Gulf Breeze, Fla.; The United States of America as represented by the Administrator of the United States Enviromental Protection Agency, Washington, D.C.

[21] Appl. No.: 308,483

[22] Filed: Sep. 19, 1994

Related U.S. Application Data

[63] Continuation of Ser. No. 37,215, Mar. 26, 1993, abandoned, which is a continuation-in-part of Ser. No. 913,274, Jul. 14, 1992, Pat. No. 5,242,825.

[51] Int. Cl.$^6$ .............................. B09B 3/00; B07C 5/38; C12N 1/00; C12N 1/20
[52] U.S. Cl. .............. 435/262.5; 435/264; 435/847; 435/253.3; 210/610; 210/631
[58] Field of Search .................. 210/610, 631; 435/253.3, 262.5, 874, 264

[56] References Cited

U.S. PATENT DOCUMENTS

| | | | |
|---|---|---|---|
| 3,899,376 | 8/1975 | Azarowicz | 195/2 |
| 4,461,834 | 7/1984 | Mudder et al. | 435/253 |
| 4,468,461 | 8/1984 | Bopp | 435/253 |
| 4,477,570 | 10/1984 | Colaruotolo et al. | 435/253 |
| 5,132,224 | 7/1992 | Mueller et al. | 435/262 |

FOREIGN PATENT DOCUMENTS

0404466  12/1990  European Pat. Off. .

OTHER PUBLICATIONS

Grady, C.P. Leslie, Jr. (1989) "The Enhancement of Microbial Activity Through Bioreactor Design" Biotechnology Application in Hazardous Waste Treatemnt, Lewandowsky, G., et al., Eds., Engineering Foundation: New York, pp. 81–93.

Kampbell, Don H., and John T. Wilson (1987) "Removal of Valatile Aliphatic Hydocarbons in a Soil Bioreactor" J. Air Poll. Control Assoc. 37(10):1236–1240.

Leson, G., and A.M. Winer (1991) "Biofiltration: An Innovative Air Pollution Control Technology for VOC Emissions" Air & Water Wast Management Association 41(8):1045–1054.

Folsom, B.R., and P.J. Chapman (1991) "Performance Characterization of a Model Bioreactor for the Biodegradation of Trichloroethylene by *Pseudomonas cepacia* G4" Applied and Environmental Microbiology 57(6):1602–1608.

Friday, David D., and Ralph J. Portier (1991) "Development of an Immobilized Microbe Bioreactor for VOC Applications" Environmental Progress 10(1):30–39.

Salkinoja–Salonen, M.S., R. Hakulinen, R. Valo, and J. Apajalahti (1983) "Biodegradation of Recalcitrant Organochlorine Compounds in Fixed Film Reactors" Wat. Sci. Tech. 15:309–319.

Hamoda, M.R., A.A. Al-Haddad (1987) "Investigation of Petroleum Refinery Effluent Treatment in an Aerobic Fixed–Film Biological System" J. Inst. Water Environ. Manage. 1(2):239–246.

Mueller, James G., Suzanne E. Lantz, Beat O. Blattmann, and Peter J. Chapman (1991) "Bench–Scale Evaluation of Altrnative Biological Treatment Processes for the Remediation of Pentachlorophenol–and Creosote–Contaminated Materials: Slurry–Phase Bioremdiation" Environmental Science & Technology 25(6):1056–1061.

Mueller, James G., Douglas P. Middaugh, Suzanne E. Lantz, and Peter J. Chapman (1991) "Biodegradation of Creosote and Pentachlorophenol in Contaminated Groundwater: Chemical and Biological Assessment" Applied and Environmental Microbiology 57(5):1277–1285.

van der Hoek, J.P., L.G.C.M. Urlings, and C.M. Grobben (1989) "Biological Removal of Polycyclic Aromatic Hydrocarbons, Benzene, Toluene, Ethylbenzene, Zylene and Phenolic Compounds from Heavily Contaminated Ground Water and Soil" Environmental Technology Letters 10:185–194.

Webb, O.F., T.J. Phelps, P.R. Bienkowski, P.M. Digrazia, G.D. Reed, B. Applegate, D.C. White, and G.S. Sayler (1991) "Development of a Differential Volume Reactor System for Soil Biodegradation Studies" Applied Biochemistry and Biotechnology 28(29):5–19.

(List continued on next page.)

*Primary Examiner*—David M. Naff
*Assistant Examiner*—Deborah K. Ware
*Attorney, Agent, or Firm*—Saliwanchik & Saliwanchik

[57] ABSTRACT

A process for remediating contaminated soil or groundwater using a strain of *Pseudomonas paucimobilis* designated NRRL B-18512 is disclosed. Further, the process is a two stage sequential process wherein in the first stage bacteria which degrade low molecular weight polycyclic aromatic hydrocarbons, heterocyclic organic compounds and phenolics are used in a pretreatment step. However, the remaining high molecular weight compounds are treated in a second step of the process with the *Pseudomonas paucimobilis* strain since the strain is not inhibited by low molecular weight compounds because these are removed in the first pretreatment step. Therefore, repeated inoculation of the strain is not necessary and the overall process disclosed eliminates the inhibitory effects of the low molecular weight compounds. A Microorganism designated CRE1-13 is a useful strain for the pretreatment step in order to enhance activity and viability of the strain, *Pseudomonas paucimobilis* designated NRRL B-18512, useful for removing the remaining high molecular compounds in creosote from soil or groundwater. In addition Pseudomonas sp. strain SR-3 is also useful for removing high molecular weight compounds in creosote.

2 Claims, 3 Drawing Sheets

OTHER PUBLICATIONS

Petrasek, A.C., I.J. Kugelman, B.M. Austern, T.A. Pressley, L.A. Winslow, and R.H. Wise (1983) "Fate of Toxic Organic Compounds in Wastewater Treatment Plants" Journal WPCF 55(10):1286–1296.

Jafvert, Chad T., and Janice K. Heath (1991) "Sediment–and Saturated–Soil–Associated Reactions Involving an Anionic Surfactant (Dodecylsulfate). 1. Precipitation and Micelle Formation" Environ. Sci. Technol. 25(6):1031–1038.

Jafvert, Chad T. (1991) "Sediment–and Saturated–Soil–Associated Reactions Involving and Anionic Surfactant (Dodecylsulfate). 2. Patition of PAH Compounds among Phases" Environ. Sci. Technol. 25(6):1039–1045.

Mueller, J.G., P.J. chapman, and P.H. Pritchard (1989) "Action of a Fluoranthene–Utilizing Bacterial Community on Polycyclic Aromatic Hydrocarbon Components of Creosote" Applied and Environmental Microbiology 55(12):3085–3090.

Mueller, James, G., Peter J. Chapman, Beat O. Blattmann, and P. Hap Pritchard (1990) "Isolation and Characterization of a Fluoranthene–Utilizing Strain of *Pseudomonas paucimobilis*" Applied and Environmental Microbiology 56(4):1079–1086.

Mahaffey, M., R. Sanford, A. strehler, A. Bourquin (1989) "Biological Treatment of Groundwater Contaminated with Creosote and Pentachlorophenol" Abstracts, American Society for Microbiology, Annual Meeting, May 14–18, 1989, New Orleans, LA, p. 338.

Dooley-Dana, M., M. Findley (1989) "Biodegradation of Liquid Coal Tar in a Bench Scale Reactor" Abstracts, American Society for Microbiology, Annual Meeting, May 14–18, 1989, New Orlenas, LA, p. 363.

Resnick, S.M., P.J. Chapman (1990) "Isolation and Characterization of a Pentachlorophenol (PCP)–Degrading Gram–Negative Bacterium" Abstracts, America Society for Microbiology, Annuial Meeting, May 13–17, 1990, Anaheim, CA, p. 300.

Retention Time

BIOREMEDIATION OF SOIL OR GROUNDWATER CONTAMINATED WITH COMPOUNDS IN CREOSOTE BY TWO-STAGE BIODEGRADATION

CROSS-REFERENCE TO A RELATED APPLICATION

This application is a continuation of application Ser. No. 08/037,215, filed Mar. 26, 1993, now abandoned, which is a continuation-in-part of application Ser. No. 07/913,274, filed Jul. 14, 1992, now U.S. Pat. No. 5,242,825.

BACKGROUND OF THE INVENTION

A wide variety of bioreactor technologies has been developed for the treatment of solid, liquid, and gaseous matrices contaminated with myriad organic chemicals (Grady, C. P. L., Jr. [1989] In *Biotechnology Application in Hazardous Waste Treatment*, Lewandowski, G., et al., Eds., Engineering Foundation: New York, pp. 81–93). Bioreactors are, in general, advantageous as compared to other bioremediation approaches (e.g., composting, land farming, and in situ treatment) because the physicochemical variables (e.g., pH, nutrient concentrations, biomass, oxygen-transfer rate, contaminant loading rate, etc.) of a bioreactor can be precisely controlled. Conditions in a bioreactor can be optimized for the desired microbial activities in order to maximize performance. Effective mixing alleviates certain mass-transfer problems, and surfactants, detergents, or solubilizing agents can be added to increase the aqueous solubility of hydrophobic contaminants, thereby enhancing the bioavailability of target chemicals. For these same reasons, bioreactor inoculation is often a viable technique to rapidly establish active biomass and enhance the desired biological activity. Together, these factors act to maximize the kinetics of biodegradation, hence enhancing the bioremediation processes.

Bioreactor strategies have been applied successfully for the bioremediation of organic contaminants. For example, biofiltration has been used extensively to remove volatile organic compounds from air emissions (Kampbell, D. H., J. T. Wilson, H. W. Read, T. T. Stocksdale [1987] *J. Air Pollut. Control Assoc.* 37:1236–1240; Leson, G., A. M. Winer [1991] *J. Air. Waste Manage. Assoc.* 41:1045–1054), vapor-phase bioreactors have treated chlorinated aliphatics in the gaseous state (Folsom, B. R., P. J. Chapman [1991] *J. Appl. Environ. Microbiol.* 57:1602–1608; Friday, D. D., R. J. Portier [1991] *Environ. Prog.* 10:30–39), and fixed film bioreactors have been used for the treatment of kraft bleaching effluent containing a variety of chlorinated aromatic chemicals (Salkinoja-Salonen, M. S., R. Hakulinen, R. Valo, Apajalahti [1983] *J. Water Sci. Technol.* 15:309–319) and for petroleum refinery effluent (Hamoda, M. F., A. A. Al-Haddad [1987] *J. Inst. Water Environ. Manage.* 1:239–246).

Attempts to apply bioreactor technologies to the treatment of soil and water contaminated with the chemicals found in organic wood preservatives have often proven unsuccessful (Dooley-Dana, M., M. Findley [1989] *Abstracts*, American Society for Microbiology, Annual Meeting, May 14–18, 1989, New Orleans, L. A., p. 363; Mahaffey, W., R. Sanford, A. Strehler, A. Bourquin, Id. at 338; Mueller, J. G., S. E. Lantz, B. O. Blattmann, P. Chapman [1991] *J. Environ. Sci. Technol.* 25:1055–1061; Mueller, J. G., D. P. Middaugh, S. E. Lantz, P. J. Chapman [1991] *J. Appl. Environ. Microbiol.* 57:1277–1285; van der Hoek, J. P., L. G. Urlings, C. M. Grobben [1989] *Environ. Technol. Lett.* 10:185–194; Webb, O. F., T. L. Phelps, P. R. Bienkowski, P. DiGrazia, G. D. Reed, B. Applegate, D. C. White, G. S. Sayler [1991] *J. Appl. Biochem. Biotechnol.* 28/29:5–19). One challenge which remains in the field of bioremediation is the limited ability to efficiently biodegrade high molecular weight polycyclic (chemicals containing four or more fused rings) aromatic hydrocarbons (HMW PAHs) present in contaminated soils and waters. Creosote is a commonly encountered wood preservative containing HMW PAHs which have previously been difficult to biodegrade. This limited success in degrading HMW PAHs is due to structural aspects of these chemicals and their strong tendency to partition to biomass, sludge, and bioreactor residues (Petrasek, A. C., I. J. Kugelman, B. M. Austern, T. A. Pressly, L. A. Winslow, R. H. Wise [1983] *Water Pollut. Control Fed.* 55:1286–1296; Jafvert, C. T., J. K. Heath [1991] *Environ. Sci. Technol.* 25:1031–1038; Jafvert, C. T. [1991] *Environ. Sci. Technol.* 25:1039–1045).

Previously, we described the isolation and characterization of microorganisms capable of utilizing HMW PAHs and other persistent creosote constituents as sole sources of carbon and energy for growth (Mueller, J. G., P. J. Chapman, P. H. Pritchard [1989] *Appl. Environ. Microbbl.* 55:3085–3090; Mueller, J. G., P. J. Chapman, B. O. Blattman, P. H. Pritchard [1990] *Appl. Environ. Microbiol.* 56:1079–1086). See also U.S. Pat. No. 5,132,224. Additionally, an axenic culture of Pseudornonas sp. strain SR3 was shown to mineralize PCP when supplied as a sole carbon source in liquid medium (Resnick, S. M., P. J. Chapman [1990] *Abstracts*, American Society for Microbiology, Annual Meeting, May 13–17, 1990, Anaheim, Calif., p. 300). A *Pseudomonas paucimobilis* strain known as EPA-505 has been described as capable of degrading high molecular weight PAHs and PCP. U.S. Pat. No. 5,132,224. However, the viability of these organisms can be inhibited by the PAHs of lower molecular weight and heterocyclic compounds found on creosote, as well as by certain phenolic compounds. Therefore, a need exists for a strategy to remove HMW PAHs and PCP by bioremediation without affecting the viability of the organisms used in the bioremediation process.

BRIEF SUMMARY OF THE INVENTION

A two-stage, sequential inoculation bioreactor strategy for the bioremediation of contaminated soil or groundwater is described. More specifically, the subject invention concerns a sequential inoculation process employing microorganisms to enhance the effectiveness of bioremediation technologies for the treatment of creosote- and PCP-contaminated soil or groundwater. The strategy can be used for soil or groundwater contaminated with compounds found in creosote, especially high molecular weight polycyclic aromatic hydrocarbons (HMW PAHs) and pentachlorophenol (PCP).

The two-stage strategy of the subject invention comprises a first step of treatment of the contaminated soil or groundwater in a bioreactor inoculated with a culture of microorganisms known to reduce contamination of lower molecular weight PAHs and certain heterocyclic and phenolic compounds, and a second step, treating the soil or groundwater treated in the first step in a bioreactor inoculated with a different microorganism which biodegrades HMW PAHs and PCP. Preferably, the second step occurs after biodegradation by the microorganism used in the first step has occurred. Bioreactor performance was assessed according to chemical analyses of system influent, effluent, and bioreactor residues, a chemical mass balance evaluation, and comparative biological toxicity and teratogenicity measurements which are known in the art. The concentration of creosote constituents was reduced more than 99%. The cumulative concentration of carcinogenic polycyclic aromatic hydrocarbons was also reduced. Moreover, the toxicity and teratogenicity of the bioreactor effluent were significantly reduced.

BRIEF DESCRIPTION OF THE DRAWINGS

FIG. 3A shows a gas chromatogram of basic extracts of groundwater bioreactor feed. FIG. 3B shows effluent from FBR1 inoculated with strains CRE1-13. FIG. 3C shows the results after FBR2 was inoculated with strains EPA-505 and SR3.

DETAILED DISCLOSURE OF THE INVENTION

Figure 1:
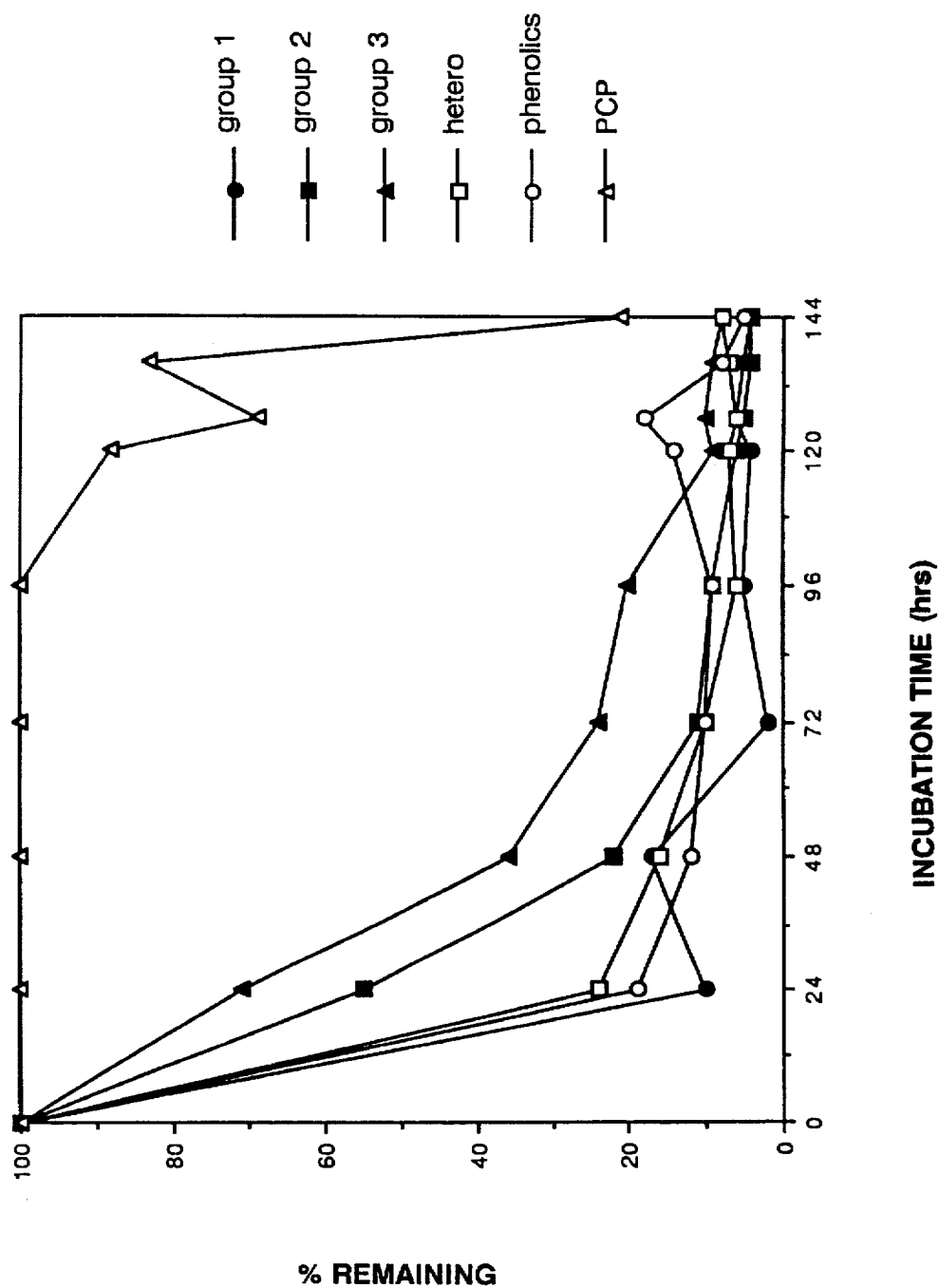
FIG. 1 shows activity of inoculant cells of specially selected microorganisms toward creosote and PCP present in groundwater medium contained in bench-scale bioreactors. Removal of 40 monitored creosote constituents and PCP following sequential inoculation under batch incubation conditions. Key: (●) group 1; (■) group 2; (▲) group 3; (□) heterocyclics; (o) phenolics; (Δ) PCP.

The subject invention concerns a novel process for decontamination of polluted soils and groundwater. The process is particularly well suited for the biodegradation of wood-preservative chemicals such as high molecular weight polycyclic aromatic hydrocarbons (HMW PAHs), constituents of creosote, and pentachlorophenol (PCP). High molecular weight PAHs are well known in the art. Examples of such compounds include benz[a]anthracene, benzo[a]pyrene, benzo[b]fluoranthene/benzo[k]fluoranthene,benzo[b]fluorene,chrysene,fluoranthene, and pyrene.

The process comprises a two-stage, sequential inoculation strategy for a bioreactor used in bioremediation of contaminated soil or groundwater. The first step of the novel process comprises treating a contaminated sample in a bioreactor inoculated with a culture of microorganisms known to biodegrade certain organic chemicals, but which can be generally ineffective for biodegradation of HMW PAHs and PCP. For example, the known and previously described microorganism strains CRE1-13 can be used for the first step.

The second step comprises treating the sample treated in step 1 in the bioreactor inoculated with a second strain of microorganism which is known to biodegrade the HMW PAHs and PCP which can remain even after treatment with the microorganisms used in step 1. Preferably, the second step is performed after biodegradation has been effected by the organism employed in the first step. Microorganisms which can be used in the second step include, but are not limited to, *Pseudomonas paucimobilis* strain EPA-505 and *Pseudomonas* sp. strain SR3. Most preferably, *P. paucimobilis* strain 505sc (NRRL B-185 12) can be used as the inoculum for step two of the subject process. This organism has been deposited in a recognized repository as described in U.S. Pat. No. 5,132,224.

Materials and Methods

Inoculum preparation and viability. Previously, we described the isolation of seven bacterial strains, designated CRE1-7 (originally described as strains FAE1-7), from creosote-contaminated soil at the American Creosote Works (ACW) Superfund site, Pensacola, Fla. (Mueller et al. [1989], supra). Another member of this community, *Pseudomonas paucimobilis* strain EPA-505, was later described for its ability to mineralize fluoranthene as a sole carbon source (Mueller et al. [1990], supra). Similarly, strains CRE8-13 were isolated from ACW soil enrichments with fractions of specification creosote 450 containing acidic (e.g., phenolic) or basic (e.g., heterocyclic) creosote constituents. Pseudomonas sp. strain SR3 was isolated from a PCP-contaminated soil from northwest Florida for its ability to utilize PCP as a sole carbon source (Resnick et al., supra). These 15 isolates are particularly useful according to the subject invention.

To generate inocula for bench-scale operations, small-scale fermentations were performed with each of the 15 individual bacterial cultures in Luria-Bertani broth. Once cells reached the late log phase ($OD_{600nm}$ ca. 1.0), they were concentrated (10,000 rpm for 10 minutes at room temperature), washed once in sterile phosphate buffer (pH 7.0), and then suspended in phosphate buffer plus 5% DMSO or 20% glycerol. For PCP-degrading strain SR3, cells were grown with glucose and yeast extract using a two-stage PCP induction process as described by Resnick and Chapman (Resnick, S. M., P. J. Chapman [submitted] "Isolation and characterization of a pentachlorophenol-degrading Pseudomonas sp.," Biodegradation). On average, 10 L of cells were concentrated to a final volume of 50 mL, resulting in a final cell density between $5 \times 10^{11}$ and $1 \times 10^{12}$ cells/mL. Cell concentrates were stored at −70° C. until used.

Prior to use in laboratory and field studies, the percent recovery of viable cells of each strain from inoculant preparations was determined by direct plate counting on nutrient agar (Dffco). Additionally, the activity of the individual strains and the 13-member community (reconstituted from inoculant preparations) toward creosote and PCP present in groundwater recovered from the ACW site was evaluated. These studies were performed in two 1.2-L Biostat M bioreactors (see following section) operated in the batch mode. Each bioreactor was filled with 1.0 L of mineral salts (MSII) medium (Mueller et al. [1989], supra) containing 1000 μL of a filter-sterilized creosote stock solution (7.0 mL of site creosote-PCP oil plus 3.0 mL of DMSO) yielding an ACW groundwater medium containing an initial concentration of 700 mg of creosote-PCP oil/L plus 300 mg of DMSO/L. The use of solubilizing agents or surfactants to enhance the aqueous solubility of hydrophobic chemicals has been well documented (Jafvert et al. [1991], supra; Jafvert [1991], supra; Edwards, D. A., R. G. Luthy, Z. Liu [1991] *Z. Environ. Sci. Technol.* 25:127–133; *A Guide to the Properties and Uses of Detergents in Biology and Biochemistry*, Neugubauer, J., Ed., Calbiochem Corp., La Jolla, Calif., 1990).

Initially, the bioreactor was inoculated with strains CRE1-13 at a density of $1 \times 10^8$ cells/mL for each strain. The bioreactor was operated in the batch mode for 6 days. On days 4, 5, and 6, strains SR3 and EPA-505 were added to the bioreactor at a concentration of $1 \times 10^6$ cells/mL. Duplicate 5.0 mL samples of bioreactor contents were removed daily for chemical analyses. Previous studies showed limited biodegradation of HMW PAHs (ca. <50%) and PCP (<5%) without the inoculation of ACW groundwater under shake flask and identical bioreactor conditions (Mueller and Middaugh [1991], supra).

Sequential inoculation, continuous-flow bioreactor: bench-scale studies. The first (BR1) of two 1.2-L Biostat M bioreactors (B. Braun Biotech, Allentown, Pa.), connected in series, was filled with 1.0 L of fresh MSII medium plus 0.03% Triton X-100 (Sigma Chemical Co.) and 0.5 mL of creosote-PCP oil (recovered from the ACW site aquifer as a dense nonaqueous-phase oil). This yielded an average total concentration of 149.4 mg/L of the 40 monitored creosote constituents plus 9.9 mg of PCP/L.

For initial inoculation, concentrated cells (1.0 mL containing ca. $5 \times 10^{11}$ cells) of strains CRE1-13 were removed from storage at $-70°$ C., thawed at room temperature, and then added to BR1 for an initial inoculum density of ca. $1 \times 10^7$ cells of each strain/mL. The reactor was operated for 24 hours in the batch mode to allow for acclimation of added biomass. Operational parameters were controlled electronically (pH 7.2, dissolved oxygen [DO] 90% of saturation, 28.5° C., 350 rpm) and monitored daily as previously described (Mueller and Lantz et al. [1991], supra).

After this acclimation period the bioreactor contents were again spiked with 0.5 mL of the ACW creosote-PCP oil and the system was converted to a flow-through mode of operation. Feed solution was introduced into BR1 at a rate of 0.7 mL/minute (24-h hydraulic retention time). Feed solutions were prepared daily by adding 1.0 mL of creosote-PCP oil and 0.3 mL of Triton X-100 to 1.0 L of MSII medium in a Teflon bottle, resulting in an average total concentration of 273.0 mg/L for 40 monitored creosote constituents plus 16.9 mg of PCP/L. These solutions were mixed constantly with a magnetic stir bar, and feed was moved through Teflon and Viton tubing with a peristaltic pump. A level control probe was used to maintain the volume of BR1 at 1.0 L. This probe was connected to a peristaltic pump which, once activated, intermittently (5-s pulsed pumping) transferred material from BR1 to the second bioreactor (BR2) through Teflon and Viton tubing. As effluent from BR1 was transferred, a cell suspension (ca. $1 \times 10^7$ cells/mL) of EPA-505 and SR3 (see inoculum preparation section) was added to BR2 at a rate of 0.3 mL/minute. The volume of reactor contents in BR2 was maintained at 1.0 L by a second-level control probe connected to another peristaltic pump. Effluent from BR2 was transferred into a 15-L holding vessel.

Continuous-flow operations with daily additions of EPA-505 and SR3 to BR2 were performed for 32 days. Duplicate 5.0-mL samples were taken daily from both bioreactors and analyzed. Feed solutions were also analyzed daily. Sequential inoculation continuous flow strategies can also be used in larger scale projects, including pilot scale and in the field.

Following are examples which illustrate procedures, including the best mode, for practicing the invention. These examples should not be construed as limiting. All percentages are by weight and all solvent mixture proportions are by volume unless otherwise noted.

EXAMPLE 1

Inoculum Viability

When inoculant cells were recovered from $-70°$ C. storage and added to 1.2-L bench-scale bioreactors containing medium prepared with creosote- and PCP-contaminated groundwater from the ACW site, the reconstituted bacterial community exhibited rapid and significant biodegradation of all monitored chemicals (FIG. 1). Initial inoculation with strains CRE1-13 resulted in the rapid, but incomplete, biodegradation of PAHs and heterocyclic and phenolic constituents of creosote. After 96-hour batch incubation, the addition of strain SR3 resulted in rapid degradation of PCP. When strain SR3 was not added to the reactor, PCP was not degraded.

The sequential addition of strain EPA-505 appeared to further reduce the concentration of HMW PAHs. Previous studies using soil slurries and/or the microflora indigenous to the ACW groundwater showed limited activity toward HMW PAHs and PCP (Mueller and Lantz et al. [1991], supra; Mueller and Middaugh et al. [1991], supra; van der Hoek et al., supra; Webb et al., supra, Petrasek et al., supra; Jafvert et al., supra). On the basis of these data, it was concluded that the inocula prepared for field operations provided viable and active cells that could rapidly degrade PCP and 40 monitored creosote constituents present in groundwater at the ACW site.

EXAMPLE 2

Bench-Scale Bioreactor Studies

After 32 days of continuous-flow operation, mass balance evaluation of analytical chemistry data showed that a majority of the monitored creosote constituents were biodegraded in the first bioreactor (BR1), but most of the PCP (88%) was found in the effluent of BR1. However, the addition of strain SR3 to BR2 resulted in the subsequent biodegradation of 77% of the PCP. Between the two bioreactors, biodegradation for PCP and group 1–3 PAHs and heterocyclic phenolic components of creosote was determined to be 71.9, 98.0, 96.2, 89.4, 94.1, and 96.9%, respectively. Previous studies with indigenous soil and groundwater microorganisms incubated under similar conditions showed little activity toward PCP and HMW PAHs (Mueller and Lantz et al. [1991], supra; Mueller and Middaugh et al. [1991], supra ). Hence, at the bench-scale level, the sequential addition of bacteria having the ability to degrade these persistent chemicals proved effective in enhancing the desired biodegradation processes.

EXAMPLE 3

Pilot-Scale Bioreactor Studies

Figure 2:
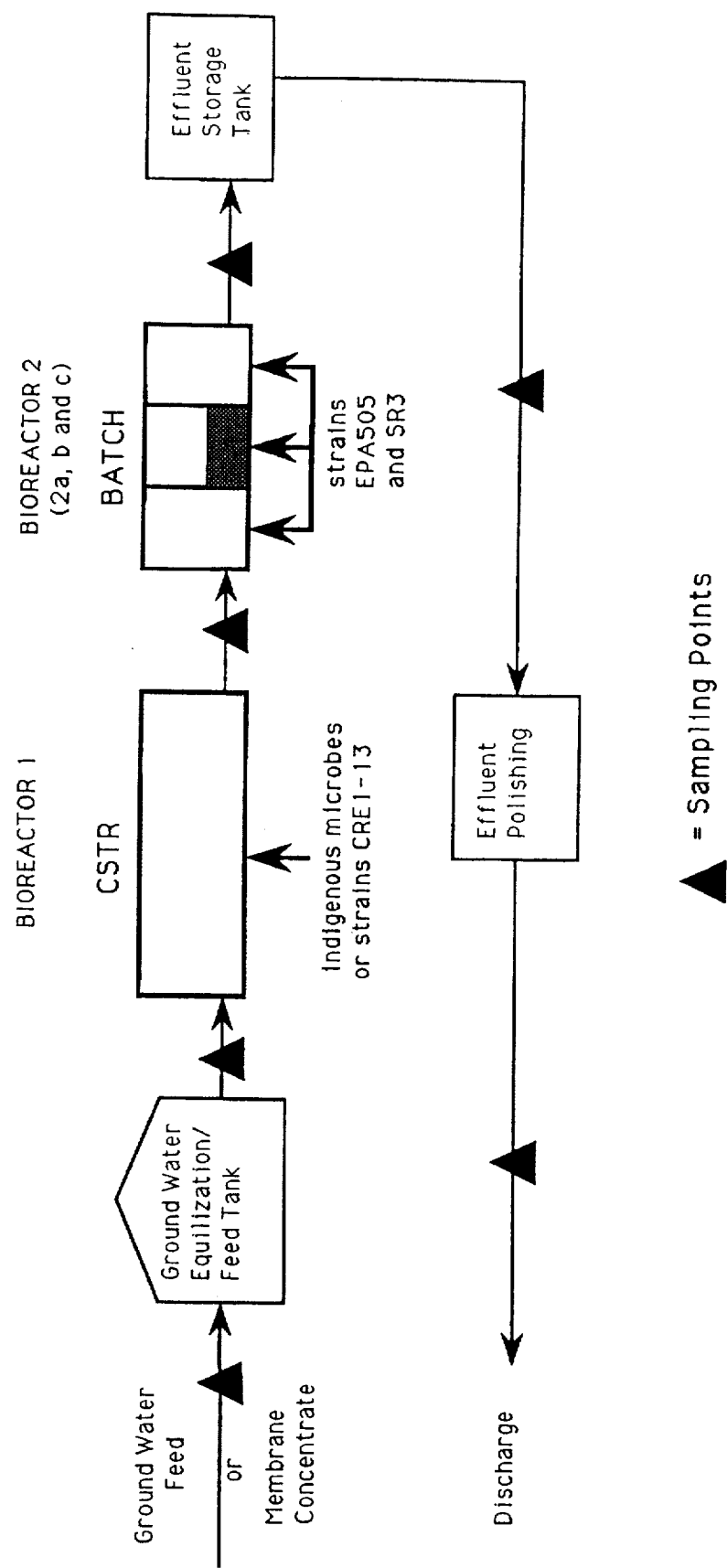
FIG. 2 is a schematic of the two-stage, continuous-flow, sequential inoculation bioreactor system at the pilot scale: (▲) sampling points.
Figure 3A:
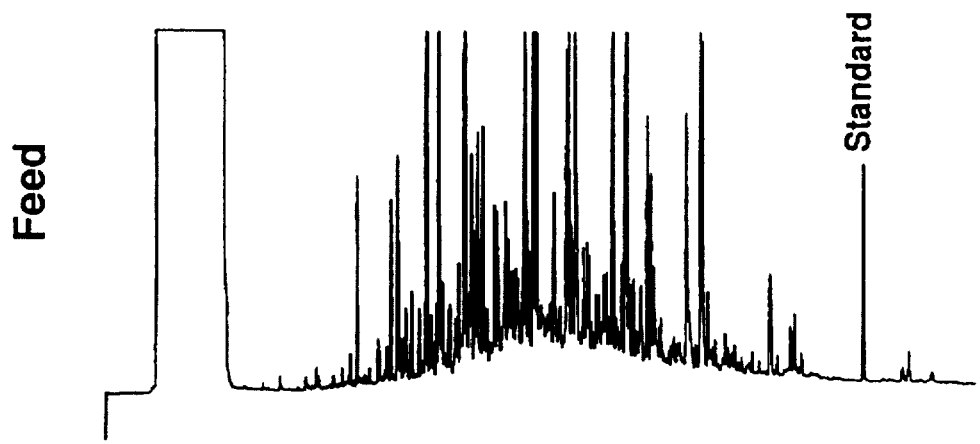
FIGS. 3A–3C show changes in chemical composition of groundwater during pilot-scale bioremediation.
Figure 3B:
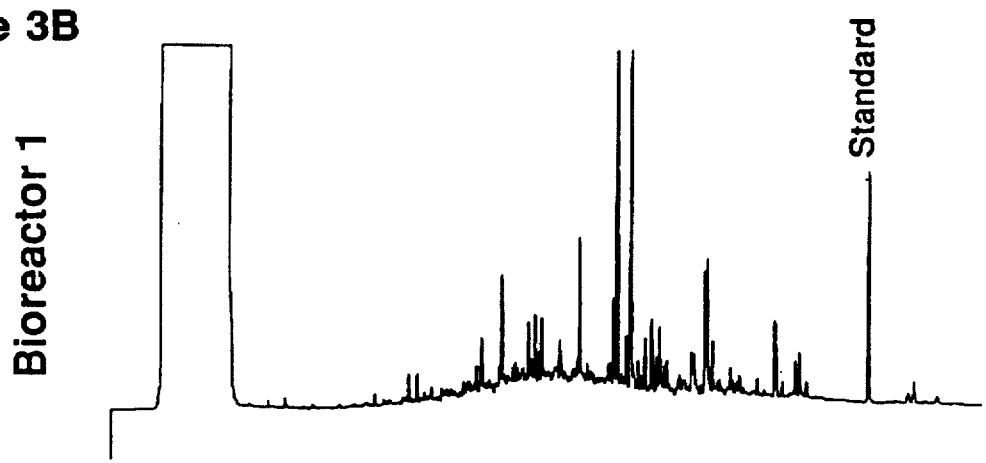
Figure 3C:
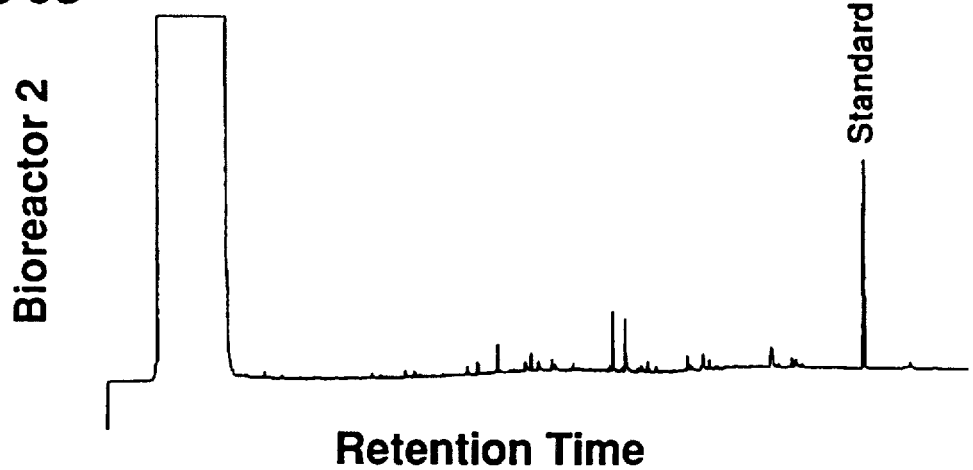

The pilot-scale bioreactor system (see FIG. 2) was effective in treating ACW groundwater in a two-step process. When gas chromatograms of organic extracts of the original feed solution (FIG. 3A) were compared with the contents of the first bioreactor (FBR1) recovered after 8 days of continuous-flow operation (FIG. 3B), it was apparent that the microorganisms present in this bioreactor (strains CRE1-13) were effective in the degradation of many creosote constituents (chromatograms made with the same attenuation and sample dilutions using dotriacontane [$C_{32}$] as the chemical standard). However, the pattern of biodegradation showed a preference for the lower molecular weight components (with shorter retention times). Thus, the higher molecular weight constituents (longer retention times) were the main contaminants introduced to FBR2 (the tall twin peaks about mid-distance on the horizontal axis represent fluoranthene and pyrene, respectively). With the addition of SR3 and EPA-505, removal of >98% of all monitored creosote constituents and approximately 70% of the PCP present in groundwater feed occurred (FIG. 3C).

These results compare favorably to those obtained from preliminary bioreactor studies using several sources of microorganisms (activated sludge from a wastewater treatment plant, municipal wastewater treatment sludge, soil slurry from the ACW site) under a variety of operating scenarios (batch bioreactor operation, single-stage inoculation). As modeled by similar studies at the bench scale, the two-stage, continuous-flow, sequential inoculation system using specially selected microorganisms was at least 50% more efficient in removing HMW PAHs and PCP at the pilot scale.

These data demonstrate that bioreactor technologies employing a two-stage sequential inoculation strategy can contribute to the effective treatment of groundwater contaminated with HMW PAHs and PCP, which are typically found at wood treatment facilities and similarly contaminated sites. The two-stage, sequential use of specially selected microorganisms in bioreactor systems resulted in significant biodegradation of persistent contaminants. Data generated at bench-scale modeled accurately the results obtained during pilot-scale studies.

It should be understood that the examples and embodiments described herein are for illustrative purposes only and that various modifications or changes in light thereof will be suggested to persons skilled in the art and are to be included within the spirit and purview of this application and the scope of the appended claims.

We claim:

1. A process remediating soil or groundwater contaminated with compounds, in creosole wherein said process comprises:

(a) pre-treating said soil or groundwater in a bioreactor inoculated with a biologically pure culture of bacteria that decades low molecular weight polycyclic aromatic hydrocarbons and heterocyclic organic compounds and phenolics found in creosote to remove the low molecular weight polycyclic aromatic hydrocarbons, heteorocyclic organic compounds, and phenolics, leaving high molecular weight polycyclic aromatic hydrocarbons or pentachlorophenol; and (b) treating said soil or groundwater pre-treated in step (a) in a bioreactor inoculated with a biologically pure culture of *Pseudomonas paucimobilis*, NRRL B-18512 that biodegrades the remaining high molecular weight polycyclic aromatic hydrocarbons or pentachlorophenol.

2. The process, according to claim 1, wherein said high molecular weight polycyclic aromatic hydrocarbon is selected from the group consisting of benz (a) anthracene, benzo (a) pyrene, benzo (b) fluoranthene, benzo (k) fluoranthene, benzo (b) fluorene, chrysene, fluoranthene, and pyrene.

* * * * *

UNITED STATES PATENT AND TRADEMARK OFFICE
CERTIFICATE OF CORRECTION

PATENT NO. : 5,614,410
DATED : March 25, 1997
INVENTOR(S) : James G. Mueller, et. al.

It is certified that error appears in the above-indentified patent and that said Letters Patent is hereby corrected as shown below:

Column 2, line 24: "*Microbbl.*" should read --*Microbiol.*-- line 28: "Pseudornonas" should read --Pseudomonas--

Column 3, line 58: "Pseudornonas" should read --Pseudomonas-- line 60: "(NRRL B-185 12)" should read --(NRRL B-18512)--

Column 4, line 5: "Pseudornonas" should read --Pseudomonas-- line 34: "(Dffco)." should read --(Difco).--

Column 6, line 3: "slurties" should read --slurries--

Column 7, line 21: "compounds, in creosole" should read --compounds in cresote--

Column 8, line 1: "that decades low" should read --that degrades low-- line 12 : "NRRL B-18512" should read --NRRL B-18512,--

Signed and Sealed this

Twenty-third Day of September, 1997

Attest:

BRUCE LEHMAN

Attesting Officer      Commissioner of Patents and Trademarks